（12）United States Patent
Shaker et al.

(10) Patent No.: US 11,521,132 B2
(45) Date of Patent: Dec. 6, 2022

(54) METHOD AND SYSTEM FOR ADAPTIVE ONLINE META LEARNING FROM DATA STREAMS

(71) Applicant: NEC Laboratories Europe GmbH, Heidelberg (DE)

(72) Inventors: Ammar Shaker, Heidelberg (DE); Christoph Gaertner, Pfalzgrafenweiler (DE); Xiao He, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 903 days.

(21) Appl. No.: 16/386,279

(22) Filed: Apr. 17, 2019

(65) Prior Publication Data

US 2020/0258008 A1 Aug. 13, 2020

Related U.S. Application Data

(60) Provisional application No. 62/804,234, filed on Feb. 12, 2019.

(51) Int. Cl.
*G06F 16/00* (2019.01)
*G06N 20/20* (2019.01)
*G06F 16/901* (2019.01)
*G06F 17/18* (2006.01)
*G06K 9/62* (2022.01)
*G06F 16/2455* (2019.01)

(52) U.S. Cl.
CPC ....... *G06N 20/20* (2019.01); *G06F 16/24568* (2019.01); *G06F 16/9027* (2019.01); *G06F 17/18* (2013.01); *G06K 9/6267* (2013.01)

(58) Field of Classification Search
CPC .. G06N 20/20; G06N 5/003; G06F 16/24568; G06F 16/9027; G06F 17/18; G06K 9/6267
See application file for complete search history.

(56) References Cited

U.S. PATENT DOCUMENTS

| 10,467,274 | B1 * | 11/2019 | Ren | G06N 3/0454 |
| 10,565,329 | B2 * | 2/2020 | Greenwood | G16B 99/00 |
| 10,878,451 | B2 * | 12/2020 | Cao | G06Q 30/0254 |
| 11,176,487 | B2 * | 11/2021 | Varadarajan | G06N 20/00 |
| 11,218,498 | B2 * | 1/2022 | Hajimirsadeghi | H04L 63/1425 |

(Continued)

OTHER PUBLICATIONS

Joao Gama, et al., "A Survey on Concept Drift Adaptation", ACM Computing Surveys (CSUR), vol. 46, No. 1, article 1, Jan. 2013, pp. 1-44.

(Continued)

*Primary Examiner* — Noosha Arjomandi
(74) *Attorney, Agent, or Firm* — Leydig, Voit & Mayer, Ltd.

(57) ABSTRACT

A method for online learning from a data stream with an ensemble of meta-trees includes: observing a data instance from the data stream; for each of the meta-trees, replicating the data instance to generate a number of replicated data instances; for each of the meta-trees, updating meta-tree components using the number or replicated data instances; and inducing each of the meta-trees based on the data instance and the updated meta-tree components. Inducing each of the meta-trees includes employing inequality concentration bound to determine whether a split criterion is satisfied.

15 Claims, 6 Drawing Sheets

(56) References Cited

U.S. PATENT DOCUMENTS

| | | | | |
|---|---|---|---|---|
| 2014/0143205 | A1* | 5/2014 | Leshchiner | G06F 16/27 |
| | | | | 707/626 |
| 2014/0279741 | A1* | 9/2014 | Sow | G06N 20/00 |
| | | | | 706/12 |
| 2017/0011029 | A1* | 1/2017 | Chatterjee | G06N 5/027 |
| 2017/0061329 | A1* | 3/2017 | Kobayashi | G06N 20/00 |
| 2018/0357552 | A1* | 12/2018 | Campos | G06F 16/901 |
| 2018/0365065 | A1* | 12/2018 | Guttmann | G06F 16/2379 |
| 2019/0066133 | A1* | 2/2019 | Cotton | G06F 17/11 |
| 2019/0087529 | A1* | 3/2019 | Steingrimsson | G06N 3/0454 |
| 2019/0197357 | A1* | 6/2019 | Anderson | G06K 9/6254 |
| 2019/0303795 | A1* | 10/2019 | Khiari | G06N 20/20 |
| 2019/0379589 | A1* | 12/2019 | Ryan | G06N 3/084 |
| 2020/0219008 | A1* | 7/2020 | Franceschi | G06N 7/005 |
| 2020/0234113 | A1* | 7/2020 | Liu | G06N 7/005 |
| 2020/0250213 | A1* | 8/2020 | Duchin | G06F 16/319 |
| 2020/0258008 | A1* | 8/2020 | Shaker | G06F 17/18 |
| 2020/0364599 | A1* | 11/2020 | Ma | G06N 10/00 |
| 2021/0064989 | A1* | 3/2021 | Shaker | G06N 3/04 |
| 2021/0081837 | A1* | 3/2021 | Polleri | G06N 20/00 |
| 2022/0012309 | A1* | 1/2022 | Shachar | G06N 3/084 |
| 2022/0043681 | A1* | 2/2022 | Moharrer | G06K 9/6231 |

OTHER PUBLICATIONS

Andre Luis Debiaso Rossi, et al., "MetaStream: A meta-learning based method for periodic algorithm selection in time-changing data", Neurocomputing, vol. 127, Dec. 2014, pp. 52-64.

Jan N. van Rijn, et al., "Having a Blast: Meta-Learning and Heterogeneous Ensembles for Data Streams", 2015 IEEE International Conference on Data Mining, Nov. 14-17, 2015, pp. 1-6.

Elena Ikonomovska, et al., "Learning model trees from evolving data streams", Data Min Knowl Disc, Oct. 15, 2010, pp. 1-41.

Jihed Khiari, et al., "MetaBags: Bagged Meta-Decision Trees for Regression", arXiv:1804.06207, Apr. 17, 2018, pages.

Elena Ikonomovska, "Algorithms for Learning Regression Trees and Ensembles on Evolving Data Streams", Doctoral Dissertation, Oct. 2012, pp. 1-222.

Pierre-Xavier Loeffel, "Adaptive machine learning to algorithms for data streams subject to concept drifts", Dec. 3, 2018, pp. 1-124.

* cited by examiner

| | BR | GP | GRB | HT | KNN | RF | SVR |
|---|---|---|---|---|---|---|---|
| winequality_red | 0.44(0.043) | 18.18(0.0581) | 0.43(0.0346) | 0.54(0.0059) | 0.62(0.0107) | 0.44(0.0042) | 0.55(0.0081) |
| winequality_white | 0.59(0.0027) | 31.01(0.0378) | 0.55(0.0043) | 0.60(0.0045) | 0.79(0.0049) | 0.58(0.0039) | 0.73(0.0023) |
| CASP | 28.17(0.0714) | 97.43(0.0599) | 26.66(0.0690) | 26.90(0.0741) | 44.10(0.0815) | 22.79(0.0456) | 44.18(0.045) |
| fried_delve | 7.08(0.0359) | 4.06(0.0127) | 2.84(0.0038) | 7.47(0.1122) | 8.52(0.0195) | 5.47(0.0186) | 8.73(0.0117) |
| CCPP | 23.06(0.0526) | 170(114.88)(53.348) | 18.65(0.0624) | 69.12(14.2613) | 27.10(0.1432) | 20.51(0.1081) | 289.94(0.5358) |
| Concrete_Data | 11.41(1.0722) | 1325.1(7.5717) | 35.02(1.030) | 236.79(6.3354) | 107.62(1.182) | 43.04(1.42) | 276.82(2.5025) |
| 24planes | 5.81(0.004) | 3.81(0.0027) | 3.18(0.0314) | 1.61(0.02) | 2.34(0.005) | 1.44(0.002) | 2.03(0.0019) |
| bank32nh | 0.0074(0.0) | 0.0014(0.0001) | 0.0085(0.0001) | 0.0107(0.0001) | 0.0091(0.0001) | 0.0094(0.0001) | 0.0112(0.0001) |
| Rome1_board | 6.95(0.0419) | 19.56(0.0461) | 21.78(0.0663) | 16.55(0.0489) | 20.13(0.0444) | 21.68(0.0485) | 18.00(0.0417) |
| Rome1_alight | 20.38(0.0468) | 23.36(0.0508) | 25.94(0.0453) | 19.93(0.05) | 24.23(0.0525) | 26.03(0.0567) | 21.76(0.0448) |
| Rome3_board | 13.34(0.030) | 17.21(0.0358) | 16.73(0.0241) | 13.41(0.0257) | 15.18(0.0347) | 16.34(0.03) | 15.94(0.036) |
| Rome3_alight | 18.47(0.036) | 23.25(0.0421) | 22.98(0.0469) | 18.24(0.0383) | 21.68(0.039) | 22.44(0.0111) | 21.46(0.0421) |
| Stockholm1_board | 23.57(0.0723) | 31.31(0.0649) | 27.87(0.1647) | 23.15(0.0403) | 27.89(0.099) | 29.20(0.1207) | 26.4(0.091) |
| Stockholm1_alight | 21.71(0.0921) | 29.32(0.1002) | 25.35(0.1583) | 21.29(0.0696) | 25.73(0.0719) | 26.9(0.1) | 24.21(0.0791) |
| Stockholm3_board | 21.99(0.1226) | 33.1(0.1464) | 25.32(0.1593) | 21.88(0.1444) | 25.95(0.1629) | 25.99(0.1161) | 26.66(0.1328) |
| Stockholm3_alight | 20.32(0.0781) | 31.00(0.0892) | 22.61(0.0813) | 19.98(0.1072) | 23.62(0.1093) | 23.67(0.1084) | 24.15(0.0844) |
| Rome1_Stockholm1_board | 20.64(0.0312) | 21.97(0.0373) | 22.97(0.0477) | 19.10(0.0377) | 21.68(0.0343) | 23.15(0.0266) | 19.76(0.0315) |
| Rome3_Stockholm1_board | 20.64(0.0331) | 24.56(0.0313) | 25.86(0.0263) | 20.40(0.0295) | 24.50(0.0361) | 26.17(0.0419) | 22.25(0.0301) |
| Rome1_Stockholm3_board | 15.35(0.023) | 20.62(0.0262) | 18.55(0.0285) | 15.55(0.0199) | 17.39(0.0272) | 18.41(0.0308) | 18.23(0.0026) |
| Rome3_Stockholm3_alight | 18.89(0.0178) | 24.95(0.0351) | 22.92(0.0371) | 18.89(0.0489) | 21.33(0.0443) | 22.68(0.016) | 22.17(0.0348) |
| Stockholm1_Rome1_board | 18.06(0.0172) | 21.51(0.0207) | 22.77(0.046) | 17.91(0.0209) | 21.43(0.016) | 22.96(0.0452) | 19.50(0.0275) |
| Stockholm3_Rome1_alight | 20.54(0.0181) | 24.30(0.0254) | 25.87(0.0781) | 20.30(0.0323) | 24.38(0.022) | 26.13(0.0468) | 22.11(0.0232) |
| Stockholm1_Rome3_board | 15.06(0.0171) | 20.12(0.0277) | 18.27(0.0307) | 15.06(0.0145) | 17.03(0.0171) | 18.08(0.0346) | 17.87(0.0234) |
| Stockholm3_Rome3_alight | 18.77(0.0326) | 24.66(0.0085) | 22.77(0.0458) | 18.53(0.0227) | 21.19(0.0203) | 22.58(0.0603) | 22.04(0.0095) |

FIG. 3a

| | BLAST | AMR | FIMTDD | OMB3 |
|---|---|---|---|---|
| winequality_red | 0.71(0.0925) | 0.50(0.084) | 0.76(0.0416) | 0.41(0.0047) |
| winequality_white | 0.73(0.0918) | 0.63(0.0039) | 0.64(0.011) | 0.53(0.0022) |
| CASP | 182.8678(18.2949)(22.2677) | 28.39(0.8383) | 29.47(0.5315) | 24.53(0.0837) |
| fried_delve | 3.71(0.011) | 5.77(0.0435) | 3.00(0.036) | 2.75(0.0225) |
| CCPP | 3108(6.1)(94.7252) | 20.15(0.058) | 28.67(0.2905) | 18.97(0.1024) |
| Concrete_Data | 123.1(1.3267) | 128.26(0.9674) | 33.75(21.8369) | 57.5(1.0625) |
| 2dplanes | 1.71(0.019) | 1.99(0.0509) | 1.39(0.075) | 1.18(0.3018) |
| bank32nh | 0.008(0.01) | 0.008(0.0001) | 0.015(0.0007) | 0.0073(0.0001) |
| Rome1_board | 17.21(0.0412) | 16.57(0.0506) | 16.75(0.0438) | 16.68(0.041) |
| Rome1_alight | 20.72(0.041) | 20.04(0.057) | 20.17(0.0446) | 20.12(0.0484) |
| Rome3_board | 13.71(0.0316) | 13.45(0.0404) | 14.29(0.0925) | 13.17(0.0447) |
| Rome3_alight | 18.7(0.056) | 18.28(0.0569) | 18.69(0.1176) | 18.07(0.0527) |
| Stockholm1_board | 24.43(0.065) | 23.28(0.1255) | 23.34(0.1467) | 23.02(0.0748) |
| Stockholm1_alight | 22.51(0.0725) | 21.25(0.0915) | 21.42(0.0924) | 21.22(0.0674) |
| Stockholm3_board | 23.11(0.1311) | 22.19(0.1447) | 21.69(0.1633) | 21.53(0.1339) |
| Stockholm3_alight | 21.08(0.0779) | 20.09(0.0651) | 19.5(0.0617) | 19.63(0.0758) |
| Rome1_Stockholm1_board | 18.67(0.0313) | 17.6(0.0656) | 17.78(0.0873) | 18.07(0.0391) |
| Rome1_Stockholm1_alight | 21.09(0.0259) | 20.29(0.0493) | 20.47(0.054) | 20.29(0.0315) |
| Rome3_Stockholm3_board | 15.74(0.0317) | 15.32(0.0403) | 16.05(0.0855) | 15.12(0.0247) |
| Rome3_Stockholm3_alight | 19.26(0.0294) | 18.67(0.0306) | 19.22(0.0799) | 18.38(0.0402) |
| Stockholm1_Rome1_board | 18.42(0.0102) | 17.83(0.0428) | 17.95(0.0492) | 17.75(0.0071) |
| Stockholm1_Rome1_alight | 20.96(0.0212) | 20.19(0.0515) | 20.41(0.0395) | 20.2(0.0189) |
| Stockholm3_Rome3_board | 15.40(0.026) | 14.71(0.0354) | 14.97(0.0447) | 14.69(0.023) |
| Stockholm3_Rome3_alight | 19.10(0.0127) | 18.28(0.0143) | 18.69(0.0723) | 18.19(0.0147) |

FIG. 3b

|  | Properties | | | | | Source and Type | | |
| --- | --- | --- | --- | --- | --- | --- | --- | --- |
|  | #ATT | #INS | RT | #TO(1.5) | #TO(3.0) | ORI | TYP | CP |
| BNG - Wisconsin | 32 | 1000000 | [-,-] | - | - | OpenML | O | R |
| BNG - Puma32H | 12 | 16353 | [-,-] | 154 | 6 | OpenML | P | R |
| BNG - Cleveland | 12 | 16280 | [-,-] | 341 | 27 | OpenML | P | R |
| BNG - CPU act | 12 | 16353 | [-,-] | 146 | 10 | OpenML | P | R |
| Red wine quality | 11 | 1599 | [3,8] | 28 | 0 | UCI | O | R |
| White wine quality | 11 | 4898 | [3,9] | 200 | 0 | UCI | O | R |
| Physicochemical | 9 | 45730 | [15.228,55.3009] | 0 | 0 | UCI | O | R |
| Friedman Artificial Domain | 10 | 40768 | [-1.228,30.522] | 0 | 0 | dcc.fc.up.pt | A | R |
| Delta Ailerons | 5 | 7129 | [-0.0021,0.0022] | 107 | 12 | dcc.fc.up.pt | O | R |
| Combined Cycle Power Plant | 4 | 9568 | [420.26,495.76] | 0 | 0 | UCI | O | R |
| Concrete | 8 | 1030 | [2332,82509] | 4 | 0 | UCI | O | R |
| 2Dplanes | 10 | 40768 | [-999.709,999.961] | 4 | 0 | dcc.fc.up.pt | O | A |
| Bank32NH | 32 | 8192 | [0,0.819665] | - | - | DELVE | O | S |
| RomeLag1(board) | 9 | 191276 | [0,184] | - | - | - | P | R |
| RomeLag1(alight) | 9 | 191276 | [0,160] | - | - | - | P | R |
| RomeLag3(board) | 15 | 175167 | [0,147] | - | - | - | P | R |
| RomeLag3(alight) | 15 | 175167 | [0,160] | - | - | - | P | R |
| StockholmLag1(board) | 9 | 46256 | [0,96] | - | - | - | P | R |
| StockholmLag1(alight) | 9 | 46256 | [0,69] | - | - | - | P | R |
| StockholmLag3(board) | 15 | 46244 | [0,96] | - | - | - | P | R |
| StockholmLag3(alight) | 15 | 46244 | [0,69] | - | - | - | P | R |
| RomeLag1(board)StockholmLag1(board) | 9 | 237532 | [0,184] | - | - | - | P | R |
| RomeLag1(alight)StockholmLag1(alight) | 9 | 237532 | [0,160] | - | - | - | P | R |
| RomeLag3(board)StockholmLag3(board) | 15 | 221411 | [0,147] | - | - | - | P | R |
| RomeLag3(alight)StockholmLag3(alight) | 15 | 221411 | [0,160] | - | - | - | P | R |

Datasets summary. Fields denote the following:
ATT - number of Attributes, #INS - number of Instances, RT - Range of the Target variable,
TO - number of Target Outliers using Tukey's boxplot(ranges=1.5,3), ORI - Origin of data, TYP - Type (Proprietary/Open) and CP - Collection Process (Real/Artificial).

FIG. 4

METHOD AND SYSTEM FOR ADAPTIVE ONLINE META LEARNING FROM DATA STREAMS

CROSS-REFERENCE TO RELATED APPLICATION

Priority is claimed to U.S. Provisional Patent Application No. 62/804,234, filed on Feb. 12, 2019, the entire disclosure of which is hereby incorporated by reference herein.

FIELD

The present invention relates to a method and system for adaptive online meta-learning from data streams.

BACKGROUND

Classical batch learning considers inducing models from fixed sets of training data, where these models are then deployed in the test environment. This learning paradigm is justified under the assumption of independent and identically distributed samples. In online learning, however, the data is not available as a whole at any point in the learning process, but it is only observed one example at a time. In other words, a stream of data is generated at a high throughput from the underlying hidden processes. One example of such a setting is where a learner faces a problem of learning and predicting electricity prices while observing hundreds of instances (e.g., request for price estimation and the actual prices) per second. Other example settings include online learning in sensor networks and for system event logs.

Learning from data streams poses challenges, particularly because it is carried out under hard constrains (e.g., limited memory, time, and computational power). (See e.g., Babcock et al., "Models and issues in data stream systems," 21st ACM SIGACT-SIGMOD-SIGART Symposium on Principles of Database Systems, pp. 1-16 (2002), the entire contents of which are hereby incorporated by reference herein). For example, one challenge is the infeasibility of storing all the data (e.g., because the data stream may be infinite). Also, in online learning, each instance of the stream can be observed only once, where it is then processed and discarded. Furthermore, the data-generating processes are subject to change, which is also known as concept drift. (See, e.g., Kifer et al., "Detecting change in data streams," 13$^{th}$ International Conference on Very Large Data Bases, pp 180-191 (2004); Gama et al., "A survey on concept drift adaptation," ACM Computing Surveys 46(4), 44:1-44:37 (2014), the entire contents of each of which are hereby incorporated by reference in their entirety). These limitations demand highly adaptive systems that fundamentally overcome these challenges where their batch counterparts would fail. (See, e.g., Domingos and Hulten, "A general framework for mining massive data streams," Journal of Computational and Graphical Statistics 12(4), pp. 945-949 (2003), the entire contents of which is hereby incorporated by reference herein). Furthermore, online learners have to overcome these challenges while still inducing models that are accurate and competitive.

Those skilled in the art may consider using existing ensemble learning methods for learning from data streams. Ensemble learning aims at inducing a set of several base learners to solve a specific problem. The idea behind most ensemble methods is to minimize the generalization error by exploiting the bias-variance trade-off, for example, by reducing the variance component while keeping the bias term unchanged (which is true when all base learners are chosen from the same hypothesis class). Because training the set of learners on the same data would lead to clones of the same model, different ensemble methods focus on how to diversify the ensemble and how to aggregate the decisions taken by the different learners into a single prediction.

Bagging is a type of ensemble learning that generates a diverse set of learners by applying bootstrapping on the learning process. (See e.g., Breiman, "Bagging predictors," Machine Learning 24(2), pp. 123-140 (1996), the entire contents of which is hereby incorporated by reference herein). To this end, each base model is learned on a replica $\mathcal{D}'$ of the training data $\mathcal{D}$ that is sampled with replacement such that $|\mathcal{D}'|=|\mathcal{D}|$. Sampling with replacement, however, does not simply carry over to the streaming setting because the size of the data stream is not known in advance. Sampling with replacement allows each training instance to be selected with probability: $1-(1-1/|\mathcal{D}|)^{|\mathcal{D}|}$, which also means that the probability for each replica to contain k copies of an instance is $$\binom{|\mathcal{D}|}{k}\left(\frac{1}{|\mathcal{D}|}\right)^k\left(1-\frac{1}{|\mathcal{D}|}\right)^{|\mathcal{D}|-k}.$$

Thus, k tends to follow a Poisson distribution Pois($\lambda$=1) when $|\mathcal{D}|\to\infty$, i.e., $$P(k)=\frac{1}{e\cdot k!}.$$

Oza-Bagging exploits this fact in order to apply bagging in the online setting. This is achieved by taking each newly observed instance $(x_i, y_i)$ in the stream $k_i^{(r)}\sim\text{Pois}(\lambda)$ times for each base learner $B_i$. (See, e.g., Oza and Russell, "Online bagging and boosting," 8$^{th}$ International Workshop on Artificial Intelligence and Statistics (2001), the entire contents of which are hereby incorporated by reference herein).

Recently, MetaBags (or meta-bagging) has been introduced, which uses bagging and meta-learning. Specifically, MetaBags applies bagging in order to induce meta-decision trees for regression, with the objective of reducing the error when selecting a learner over the others. (See e.g., Khiari et al., "Bagged metadecision trees for regression," ECML PKDD Machine Learning and Knowledge Discovery in Databases European Conference (2018), the entire contents of which is hereby incorporated by reference herein).

Meta-learning deals with learning from the learner's performance and behavior. Meta-learning is the type of learning that considers both the declarative and the procedural bias, which are introduced by the hypothesis space the preference relation on the hypothesis space, respectively. (See, e.g., Brazdil et al., "Metalearning: Applications to data mining," (2008), the entire contents of which are hereby incorporated by reference herein). Common features that characterize meta-learning include: (i) the ability to adapt with more experience; (ii) the exploitation of the data's meta-knowledge; and (iii) the consideration of meta-knowledge from multiple domains. (See, e.g., Lemke et al., "Metalearning: a survey of trends and technologies," Artificial Intelligence Review 44(1), pp. 117-130 (2015), the entire contents of which are hereby incorporated by reference herein). A meta-decision tree (MDT) is a structure that defines a hierarchical algorithm recommender that selects a learner to be used for an instance reaching a leaf node of the decision tree. (See. e.g., Todorovski and Dzeroski, "Combining classifiers with meta decision trees," Machine Learning 50(3), pp. 223-249 (2003), the entire contents of which is hereby incorporated by reference herein). MDTs are induced by applying stacking that uses the base learners' confidences as landmarkers and have been proposed primarily for the classification setting. (See, e.g., Pfahringer et al., "Meta-learning by landmarking various learning algorithms," ICML (2000); Bensusan and Giraud-Carrier, "Discovering task neighbourhoods through landmark learning performances," 4th European Conference on Principles of Data Mining and Knowledge Discovery PKDD, pp. 325-330 (2000), the entire contents of each of which are hereby incorporated by reference herein). In order to make generalizations about the learning process of different data sets, the meta-learning system needs to describe these data sets adequately. These characteristics are called meta-features, and include, for example, statistical and information-theoretic measures of the data.

Ensemble learning methods, such as Bagging and Meta-Bags, however, cannot simply be carried over to the data stream learning scenario because the base models are not capable of being trained "online". That is the ensemble learning methods cannot handle instances arriving one at a time, and training the base models on-the-fly.

State-of-the-art methods for online learning primarily include works that focus on categorical predictions (classification), with only a few for real-valued predictions (regression)—e.g., AMRules (see, e.g., Almeida et al., "Adaptive model rules from data streams," ECML PKDD Machine Learning and Knowledge Discovery in Databases European Conference, pp. 480-492 (2013); Duarte et al., "Adaptive model rules from high-speed data streams," ACM Trans. on Knowledge Discovery from Data 10(3), pp. 30:1-30:22 (2016) the entire contents of each of which are hereby incorporated by reference herein) and FIMTDD (see e.g., Ikonomovska et al., "Learning model trees from evolving data streams," Data Mining and Knowledge Discovery 23(1), pp. 128-168 (2011), the entire contents of which are hereby incorporated by reference herein). While adaptive approaches try to cope dynamically with the nature of incremental accumulation of knowledge, algorithm recommendation (as a branch of meta-learning) is concerned only with providing a recommendation after the learning has finished (e.g., by learning from the learners' performance).

In the realm of learning from data streams, being incremental and adaptive are important because they allow for one-pass learning that maintains a good performance even when changes happen. Hoeffding trees (see, e.g., Domingos and Hulten, "Mining high-speed data streams," $6^{th}$ ACM SIGKDD International Conference on Knowledge Discovery and Data Mining, pp. 71-80 (2000), the entire contents of which are hereby incorporated by reference herein) and adaptive Hoeffding trees (Bifet and Gavaldá, "Adaptive learning from evolving data streams," 8th International Symposium on Intelligent Data Analysis, pp. 249-260 (2009), the entire contents of which is hereby incorporated by reference herein) adhere to the steaming requirements and achieve good results for classification on data streams. These approaches exploit statistical guarantees provided by the Hoeffding bound. (See e.g., Hoeffding, "Probability inequalities for sums of bounded random variables," Journal of the American Statistical Association 58(301), pp. 13-30 (1963), the entire contents of which is hereby incorporated by reference herein). Similarly, AMRules and FIMTDD apply the same guarantees for the variance reduction as a splitting criterion when learning from regression streams.

The state-of-the-art online data learning methods, however, suffer from poor efficiency and accuracy.

SUMMARY

An embodiment of the present invention provides a method for online learning from a data stream with an ensemble of meta-trees that includes: observing a data instance from the data stream; for each of the meta-trees, replicating the data instance to generate a number of replicated data instances; for each of the meta-trees, updating meta-tree components using the number or replicated data instances; and inducing each of the meta-trees based on the data instance and the updated meta-tree components. Inducing each of the meta-trees includes employing inequality concentration bound to determine whether a split criterion is satisfied.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 3a and 3b are chart comparing the performance of an embodiment of an OnlineMetaBags system of the present invention versus other machine learning models;

FIG. 4 is a chart showing data sets and streams used in the experiments associated with FIGS. 3a and 3b.

DETAILED DESCRIPTION

Figure 1:
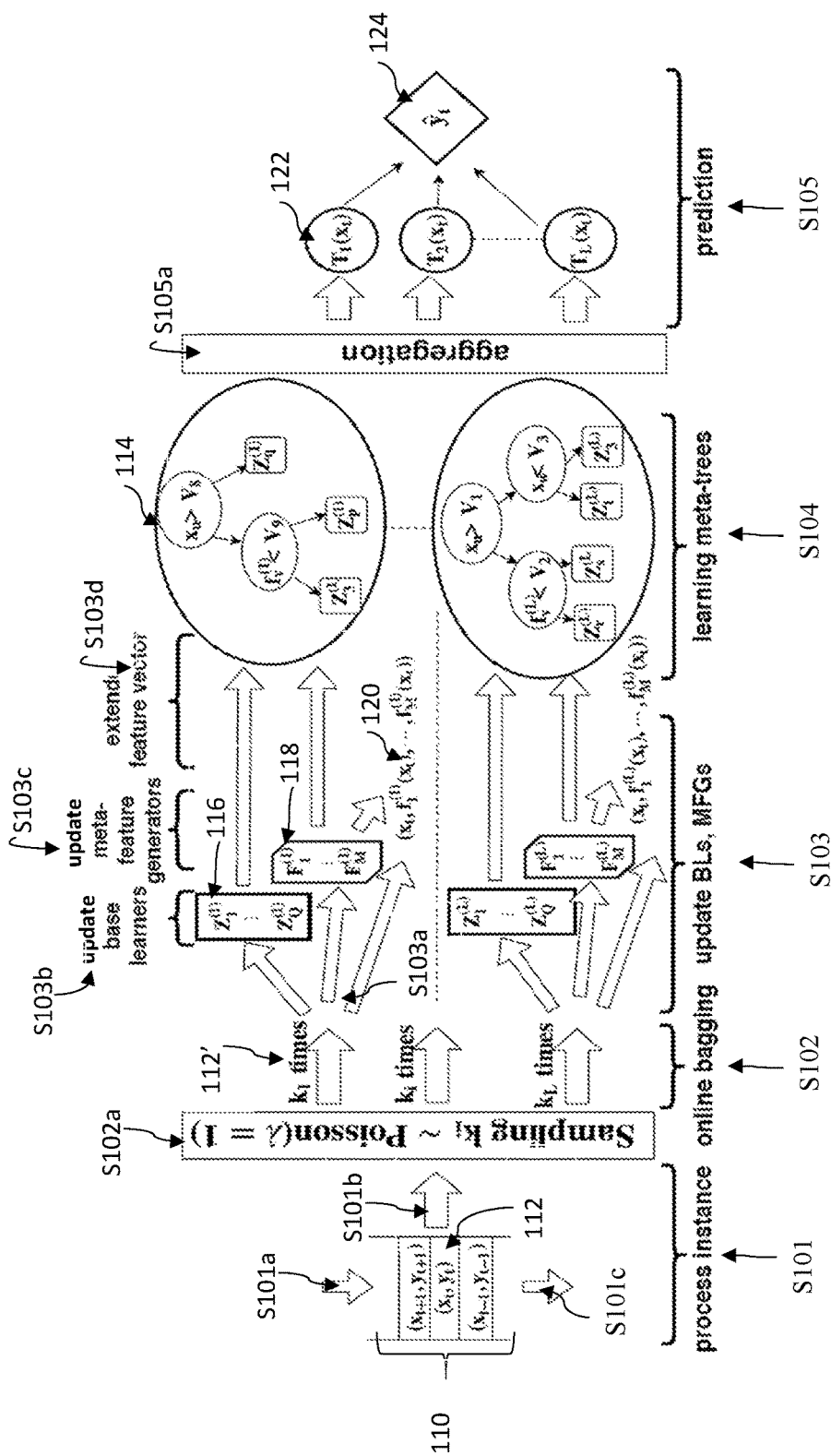
FIG. 1 illustrates an embodiment of a system and method for OnlineMetaBags induction and prediction according to the present invention.

Embodiments of the present invention provide an adaptive model induction and integration (of base learners) on the meta-level to enable an efficient and accurate online learning mechanism, referred to herein as OnlineMetaBags. Embodiments of the present invention learn an ensemble of meta-trees, where each tree serves as an algorithm recommender for regression data streams.

As discussed above, online learning (i.e., learning from data streams) poses significant challenges (e.g., infeasibility of storing data, fleeting data, processing constraints, concept drift, etc.). Highly adaptive systems are required to overcome these challenges, which rules out batch learning systems. Further, state-of-the-art meta-learning systems, such as MetaStream (see, e.g., Rossi et al., "MetaStream: A metalearning based method for periodic algorithm selection in time-changing data," Neurocomputing 127, 52-64 (2014), the entire contents of which is hereby incorporated by reference herein) and Blast (see, e.g., van Rijn et al., "Having a Blast: Meta-Learning and Heterogeneous Ensembles for Data Streams," 2015 IEEE International Conference on Data Mining (2015), the entire contents of which is hereby incorporated by reference herein), have significant disadvantages compared to the present invention. For example, MetaStream fails to qualify for the online learning setting because it recommends a predictor for a window of instances, which requires a halting of the learning processes until a reasonable number of instances have been collected. BLAST, recommends a learner on instance level using the past performance of the base-learners, as opposed to using the instance's features. As a result, BLAST's performance is upper-bounded by the performance of the best seen model induced so far. Blast was also proposed only for classification and not for regression problems.

Embodiments of the present invention, overcome the deficiencies other meta-learners have in the online setting (i.e., learning on data streams). Indeed, as discussed below, embodiments of the present invention outperform other learning methods, such as: (i) Competitive meta-learners on data streams (e.g., BLAST); (ii) other incremental regressors on data streams (e.g., AMRules and FIMTDD); and (iii) base learners.

Embodiments of the present invention enjoy the properties of adaptive learners that learn on streams of data and the properties of meta-learners that learn from both the data and the learning patterns of the base learners. Additionally, embodiments provide such a learning mechanism that learns an adaptive meta-model in an online manner, while having the properties of efficient ensemble learning, and providing decision boundaries that are non-axis parallel in the original input space. Embodiments enable the modeling of linear relations between the different features using simpler trees.

In order to solve the meta-learning problem from data streams when the data is observed incrementally, embodiments exploit concentration bounds, such as the Hoeffding bound, that inform about statistical guarantees when measures are to be computed online and not in a batch manner. Embodiments may also apply a version of online bagging on the adaptive meta-learner, and thus, achieve a reduction in the variance of the generalization error.

Embodiments of the present invention provide an induction method that: uses model-based meta-features to generate predictor-recommending trees with internal nodes that ensure a non-axis-parallel partitioning of the input space, thus, improving prediction accuracy; and reduces simultaneously the variance on the output space and the model-bias in the base learners' space, which leads to the induction of meta-decision trees that are more compact in size and more accurate.

Thus, embodiments of the present invention provide technical improvements in the area of machine learning, which enable reaching a better generalization performance; having improved prediction accuracy; having more compact and accurate meta-decision trees; and having improved efficiency.

Embodiments are discussed in the context of the general setting of learning from regression data streams where each example is observed only once, used for training, and then discarded. But, the invention is not so limited.

According to an embodiment, a method is provided for performing supervised learning given a data stream that includes one or more of the following operations:
(i) Data observation and processing, where each training instance is observed and preprocessed.
(ii) Each training instance is replicated a number of times according to the Poisson distribution with $\lambda=1$; and then, it is forwarded to each meta-decision tree induction procedure.
(iii) At the level of a single meta-decision tree, each received training instance is used to update the base learners and the meta-feature generators. Afterwards, the training instance is used to induce incrementally the meta-decision tree.
(iv) The meta-decision tree induction decides whether or not the splitting criterion is satisfied by using the Hoeffding inequality. The incremental meta-tree induction employs one of the splitting criterion:
  a. Variance reduction for the case of regression.
  b. Maximizing the information gain for classification problems.
(v) In the testing/prediction phase, the meta-trees' decisions are aggregated (for a given testing instance) using an error-weighting scheme.

An embodiment of the present invention provides a method for online learning from a data stream with an ensemble of meta-trees that includes: observing a data instance from the data stream; for each of the meta-trees, replicating the data instance to generate a number of replicated data instances; for each of the meta-trees, updating meta-tree components using the number or replicated data instances; and inducing each of the meta-trees based on the data instance and the updated meta-tree components. Inducing each of the meta-trees includes employing a concentration bound (e.g., the Hoeffding inequality) or maximizing the information gain to determine a split criterion.

The number of replicated data instances can be selected according to the Poisson distribution with $\lambda=1$.

In an embodiment, the meta-tree components include base learners and meta-feature generators, and the base learners and meta-feature generators are induced and updated based on the corresponding number of replicated data instances. The base learners can be incremental learners, and the data instance can be discarded prior to updating the base learners based on a new data instance from the data stream. The base learners may include at least one non-incremental learner, the non-incremental learner being batch updated based on a sliding window of data instances, including the data instance, and the data instance can be discarded when it is outside the siding window.

In an embodiment, the online meta-learner is configured to perform regression predictive modeling, and the split criterion is determined by a variance reduction calculation.

The variance reduction calculation can be based on a decrease in a variance caused by splitting a set of instances covered by a leaf node into two sets of instances. The variance reduction calculation determines a highest achieved variance reduction and a second highest achieved variance reduction up to receiving the data instance, and a reduction ratio R is determined as the ratio of the second highest achieved variance over the highest achieved variance.

In an embodiment, a split is accepted and performed upon observing that $R+\epsilon<1$, where $$\epsilon = \sqrt{\frac{\ln\left(\frac{1}{\delta}\right)}{2t}}$$

and $\delta$ is a confidence level, (when the concentration inequality is chosen to be the Hoeffding inequality).

In an embodiment, a penalty criterion is applied to make it gradually more difficult for a split to be accepted in fully grown meta-trees.

In an embodiment, a predictive weight of each of the meta-trees is updated relative to an error between the target value and a predicted value.

The predictive weight of each of the meta-trees may also be updated relative to the number of replicated instances for the corresponding one of the meta-trees.

In an embodiment, the online meta-learner is configured to perform classification predictive modeling, and the split criterion is determined by maximizing information gain.

The method may further include: observing a non-training instance based on observing a feature vector without an accompanying target value; for each of the meta-trees, determining a base learner for performing a prediction; performing the prediction by the determined base learner of each of the meta-trees to determine a plurality of predicted values based on the non-training instance; aggregating the predicted values to determine the predicted value using an error weighted scheme; and outputting the predicted value.

Another embodiment of the present invention provides an online meta-learner having a processor coupled to a non-transitory storage memory containing instructions, which when executed by the processor, cause the online meta-learner to: observe a data instance from a data stream; for each of the meta-trees, replicate the data instance to generate a number of replicated data instances; for each of the meta-trees, update meta-tree components using the number or replicated data instances; and induce each of the meta-trees based on the data instance and the updated meta-tree components. Inducing each of the meta-trees includes employing the Hoeffding inequality to determine a split criterion.

Another embodiment of the present invention provides a non-transitory processor-readable storage medium storing instructions that upon execution cause an online meta-learner to: observe a data instance from a data stream; for each of the meta-trees, replicate the data instance to generate a number of replicated data instances; for each of the meta-trees, update meta-tree components using the number or replicated data instances; and induce each of the meta-trees based on the data instance and the updated meta-tree components. Inducing each of the meta-trees includes employing a concentration bound (e.g., the Hoeffding inequality) to determine whether a split criterion is satisfied.

Embodiments of the present invention conduct supervised learning from data streams. In supervised learning from data streams, the training data is given as a set $D=\{(x_i, y_i): i=1, \ldots, N\}$ where i is the time index with input space X and output space Y. The objective in supervised learning is to find a mapping $f: X \rightarrow Y$ that generalizes well for samples outside the training data but drawn from the same population.

Because embodiments are dealing with a stream of data, embodiments can be described according to processing one instance level, and not on the whole data level (i.e., embodiments can be defined by how a method learns and reacts upon observing a new instance without the need to observe the training data as a whole). Also, any data set can be processed by embodiments of the present invention by sorting the data set and presenting it in an instance-by-instance manner.

Embodiment of the present invention employ Online MetaBags data learning that includes creating online-bags via MetaBagsRegression and induces meta-trees from the online-bags via UpdateMetaTreeRegression.

Embodiments employ bagging on the meta-level by applying Oza's proposal for the online setting. To this end, each bag $D^j$ (replica of the stream) is constructed by replicating each newly observed instance $(x_t, y_t)$ $k^j$ times such that $k^j \sim \text{Pois}(\lambda=1)$. For example, where each newly observed instance includes a feature vector, the full feature vector of that instance is replicated k times according to a Poisson distribution for each bag. That is, each bag gets k number of copies of the full feature vector of the current instance, where the number of copies k varies for each of the bags according to the Poisson distribution where $\lambda=1$.

From each bootstrapped bag $D^j$, the set of meta feature generators $F^j$ and the set of base learners $B^j$ are induced and updated. Since the updates of the base learners and feature generators are performed incrementally, there is no need to explicitly store and maintain the set $D^j$. This is of course only true, if each learner can be fitted incrementally, otherwise, non-incremental learners can be obtained by training batch learners on a sliding window.

The meta-decision tree also observes each instance $k^j$ times and updates its structure/parameters accordingly. Prior to that, the predictive weight of each meta tree is updated in a way that is relative to the error committed on $t^{th}$ instance and weighted by $k^j$.

For the meta-tree $MT_j$, its non-normalized weight $wSSE_t$ after observing the instance $(x_t, y_t)$ is:

$$Z_t^{(j)} = \alpha \cdot Z_{t-1}^{(j)} + k_t^{(j)},$$

$$wSSE_t^{(j)} = \frac{Z_{t-1}^{(j)}}{Z_t^{(j)}}\left(\alpha \cdot wSSE_{t-1}^{(j)}\right) + \frac{k_t^{(j)}}{Z_t^{(j)}}(y_t - T_j(x_t))^2,$$

where $Z_t^j$ is the normalization factor after observing the $t^{th}$ instance, and $\alpha \in ]0,1[$ is a forgetting factor.

Algorithm 1 is an embodiment of the MetaBagsRegression algorithm illustrating functional operations of the OnlineMetaBags learning mechanism of the present invention.

---

Algorithm 1: MetaBagsRegression

Input: $(x_t, y_t)$: new training example at time $t$.
$\mathbb{T} = \{T_j | j \in \{1 \ldots L\}\}$: set of meta decision trees.
$\mathbb{F}^{(j)} = \{F_i^{(j)} | i \in \{1 \ldots M\}\}$: incremental meta features generators for $T_j$.
$\mathbb{B}^{(j)} = \{B_i^{(j)} | i \in \{1 \ldots Q\}\}$: incremental base learners for $T_j$.
1 for $j \in \{1 \ldots L\}$ do:
  2 draw weight $k_t^{(j)} \sim \text{Poisson}(1)$
  /* precompute the error estimators per meta tree */
  3 $Z_t^{(j)} = \alpha \cdot Z_{t-1}^{(j)} + k_t^{(j)}$ /* normaliz. factor $Z_t^{(j)}$ */

4 $wSSE_t^{(j)} = \frac{Z_{t-1}^{(j)}}{Z_t^{(j)}}\left(\alpha \cdot wSSE_{t-1}^{(j)}\right) + \frac{k_t^{(j)}}{Z_t^{(j)}}$ $(y_t - T_j(x_t))^2$ /* update the meta features generators */
  5 for $i \in \{1 \ldots M\}$ do
    6 update $F_i^{(j)}$ on $(x_t, y_t)$, $k_t^{(j)}$ times
  /* update the base learners */
  7 for $i \in \{1 \ldots Q\}$ do
    8 update $B_i^{(j)}$ on $(x_t, y_t)$, $k_t^{(j)}$ times
  9 UpdateMetaTreeRegression($T_j$, $(x_t, y_t)$, $k_t^{(j)}$, $\mathbb{F}^{(j)}$, $\mathbb{B}^{(j)}$)

---

Meta Tree Induction: In embodiments, meta-trees, which perform dynamic selection and recommendation of algorithms that should be used as a predictor for a given query instance, are induced.

Each meta-tree $MT_j$ is induced from an incrementally constructed bag of examples. Upon observing the instance $(x_t, y_t)$, the set of its meta-features (and landmarkers)

$\{f_1^j, \ldots, f_M^j\} = \bigcup_t^M F_j(x_t)$ is generated. Thus, the extended instance takes the form $\{\alpha_{ti}\} = \{x_{t1}, \ldots, x_{td}, f_1^j, \ldots, f_M^j\}$—i.e., the original attributes, the meta-features (and the landmarkers). The meta-tree $MT_1$ is a binary tree, where each internal node holds a condition of the form $\alpha_{ti} < v_{iq}$ such that the instance $(x_t, y_t)$ traverses to the left child node if its $i^{th}$ extended feature is smaller than the value $v_{iq}$ and to the right child node otherwise. When reaching a leaf node p, the base learner that is recommended by that leaf node is used for prediction for that instance.

Finding the right splitting point is driven by the criteria of reducing the variance on the target attribute. Variance reduction as a splitting criterion finds its roots in the earliest decision tree induction methods, which choose splits that decrease the impurity of leaf nodes. These splits, however, lead to an axis-parallel discretization of the attribute space; this restriction makes it very difficult to model simple linear relation spanning across the different features. Because the meta-features are model-based features, trees that consider these attributes lead to non-axis parallel discretization of the original attribute space, due to the imposed non-linearity of the attributes.

Variance reduction considers the decrease in variance (in the output) caused by splitting a set of instances Z, covered by a leaf node p, into the two sets $Z_{p_{left}}$ and $Z_{p_{right}}$ based on the attribute $\alpha_q$ and one of the values v it takes, i.e., $Z_{p_{left}} = \{(\{a_i\}, y) \in Z | a_q \leq v\}$ and $Z_{p_{right}} = \{(\{a_i\}, y) \in Z | a_q > v\}$. The variance reduction is defined as the difference of the original variance and the weighted variances after the split:

$$VarRed_v = Var_N - \frac{Z_{p_{left}}}{Z_p} Var_{N_{left}} - \frac{Z_{p_{right}}}{Z_p} Var_{N_{right}}.$$

An exact computation of the variance reduction caused by each of the possible values of each attribute (or at least each unique observed value of each attribute), can be analytically computed in incremental manner. This, however, requires a quadratic number of updates in the number of observations (for each attribute). An extended binary search tree (E-BST) is a data structure that enables the approximate incremental computation of the variance reduction for a set of possible splitting points. See, e.g., Ikonomovska. "Algorithms for learning regression trees and ensembles on evolving data streams," PhD thesis, Jožef Stefan International Postgraduate School (2012) (the entire contents of which is incorporated by reference herein). The cost of updating this structure is logarithmic in the number of candidate splits C, whereas, computing the variance reduction is linear in C and independent of the number of observed instances.

The decision whether the variance reduction caused by the split $a_{ti} < v_{iq}$ causes indeed the highest achievable variance reduction among all the possible splits can be, theoretically, taken only after observing all the data, which is not an option when learning from data streams. However, concentration bounds, such as the Hoeffding bound, play a central role in providing statistical evidence of the performance/precision/quality of a parameter without observing the whole population. Embodiments employ the Hoeffding inequality to obtain an early evidence that a given split leads to the guaranteed largest variance reduction in comparison to other splits. To this end, embodiments find the best and second best variance reductions achieved up to the $t^{th}$ instance, $VarRed_{best}^t$ and $VarRed_{2best}^{(t)}$. Let the reduction ratio be $$R^{(t)} = \frac{VarRed_{2best}^{(t)}}{VarRed_{best}^{(t)}}.$$

A given split is accepted and performed (at time t), upon observing $R^{(t)} + \epsilon < 1$ where $$\epsilon = \sqrt{\frac{\ln\left(\frac{1}{\delta}\right)(R)^2}{2t}}$$

with R=1 (the width of the ratio's range [0,1]) and $\delta$ is the confidence level, (when the concentration inequality is chosen to be the Hoeffding inequality). Satisfying the previous inequality means that the true ratio is less than one, i.e., $E[R^{(t)}] < 1$, with probability $1-\delta$, since the Hoeffding inequality tells us that the difference between the observed ratio $R^{(t)}$ and the true ratio $E[R^{(t)}]$ is less than $\epsilon$.

Additionally, embodiments avoid the excessive growth of the meta-tree that leads to avoidable overfitting by applying a penalty criteria that makes it gradually more difficult for splits to be accepted in fully grown trees. To this end, embodiments add the complexity $\gamma$ to the left side of the inequality, where $\gamma$ is exponentially decaying with increasing tree size, i.e., $$\gamma = \exp\left(-\frac{1}{|MT_j|}\right).$$

In embodiments addressing a classification problem, the splitting criterion employed may include maximizing the information gain. More precisely, the gain is computed as the difference between the entropy in the original node (before splitting) and the weighted entropies after the splitting. The entropy here is a measure of impurity of the data residing at a leaf node.

Once the splitting condition is fulfilled at a given leaf node p, this node is split into two leaf nodes $p_{left}$ and $p_{right}$. At each leaf node, the base learner with the least generalization error for instances covered by that leaf is selected, i.e., $$B_u = \underset{B_j \in \mathbb{B}}{\operatorname{argmin}} \sum_{(x, y) \in Z_u \subset Z} \ell(y, B_j(x)), \qquad (3)$$

where $Z_u$ is the set of instances covered by u and $u \in \{p_{left}, p_{right}\}$.

Algorithm 2 is an embodiment of the UpdateMetaTreeRegression algorithm illustrating functional operations of the meta-tree induction mechanism of the present invention.

---

Algorithm 2: Update MetaTreeRegression

---

Input: $T_j$: current meta tree.
$(x_t, y_t)$: new training example at time t.
$k_t^{(j)}$ ) weight of the current instance.
$\mathbb{F}^{(j)} = \{F_i^{(j)} \mid i \in \{1 \ldots M\}\}$: incremental meta features generators for $T_j$.
$\mathbb{B}^{(j)} = \{B_i^{(j)} \mid i \in \{1 \ldots Q\}\}$: incremental base learners for $T_j$.
/* constants: $\delta$: confidence level */

-continued

Algorithm 2: Update MetaTreeRegression

/* τ: tie-breaking constant, γ: complexity constant */
1 Traverse tree $T_j$ to leaf p, which forms a hyperrectangle that contains $x_t$
2 $n_p$: number of examples seen by the leaf p
/* compute the meta features */
3 $\{f_1^{(1)}, \ldots, f_M^{(1)}\} = \cup_{i\_1}^M F_i(x_t)$
4 for $a_i \in \{x_{t1}, \ldots, x_{td}, f_1^{(1)}, \ldots, f_M^{(1)}\}$ do
    /* use $a_i$ and $k_t^{(j)}$ to compute and store the candidate
    values in an extended binary search tree (E-BST)
    */
    /* for each candidate attribute $a_i$, and each
    candidate value $v_{iq}$, compute the incremental error
    of each base learner for the samples in the
    current split
    */
5 $n_p = n_p + k_t^{(j)}$
6 find $a_{Best}, v_{Best}, \text{VarRed}_{Best}$ that has the largest VarianceReduction
7 find $a_{2ndBest}, v_{2ndBest}, \text{VarRed}_{2ndBest}$ that has the 2nd largest VarianceReduction 8 $\varepsilon = \sqrt{\dfrac{\ln\left(\dfrac{1}{\delta}\right)(R)^2}{2n}}$ /* update the complexity term */
9 $\gamma_j = \gamma \cdot \exp\left(-\dfrac{1}{|T_j|}\right)$ 10 $X = \dfrac{\text{VarRed}_{2ndbest}}{\text{VarRed}_{best}}$ 11 if $((\overline{X} + \varepsilon + \gamma_j) < 1 \text{ OR } \varepsilon < \tau)$ then
12   replace p by $(p_{left}, p_{right})$ based on the attribute $a_{Best}$ and the splitting value $v_{Best}$
13   choose $B_{left}, B_{right}$ that have the lowest errors for the new leaves $p_{left}, p_{right}$ An embodiment of a method and system according to the present invention is illustrated in FIG. 1. FIG. 1 illustrates an online MetaBags embodiment with induction and prediction.

As part of a processing operation (S101), an OnlineMetaBags system 100 receives (S101a) an incoming data stream 110, which is a stream of data instances 112. In a training mode, the data instances 112 are training instances containing (x, y), where x is the feature vector and y is the target value. In a test phase and prediction phase, the instances 112 would not have the target value y.

The OnlineMetaBag system observes (S101b) a current instance 112. That is, at current time t the observed instance 112 contains ($x_t$, $y_t$). Also, because the OnlineMetaBag system is an online system, in embodiments, a previous instance 112 (i.e., the instance 112 at previous time t−1 that contains ($x_{t-1}$, $y_{t-1}$)) can be discarded (S101c).

The OnlineMetaBag system 100 then performs online bagging (S102) on the observed instance 112. In an OnlineMetaBag system 100 having an ensemble of meta-trees 114 of size d, for each meta-tree 114, the training instance 112 is replicated (S102a) a number $k^j$ of times according to the Poisson distribution with λ=1 to create $k^j$ copies of the instance 112'. The $k^j$ copies of the instance 112' constitute the participation of this instance in the bag that would have been created by sampling with replacement in conventional bagging.

The OnlineMetaBag system 100 then updates (S103) its base learners 116 and meta-feature generators 118. Here, these $k^j$ copies of the instance 112' are propagated (S103a) to the components of each of the meta-trees 114, namely the corresponding base learners 116 and meta-feature generators 118. Each base learner 116 (incremental or not) is then updated (S103b) using a copy of the instance 112'; and each meta-feature generator 118 is updated (S103c) using a copy of the instance 112'. The corresponding copy of the instance 112' is then extended (S103d) with the new meta-features ($x_t$, $f_1^j(x_t)$, ..., $f_M^j(x_t)$) generated by the meta-feature generator 118 to create an extended instance 120.

The meta-trees $MT_j$ 114 of the OnlineMetaBags system 100 are then updated (e.g., induced) (S104). In particular, for each of the meta-trees 114, the corresponding set of updated base learners 116, meta-feature generators 118, and the extended instance is passed on as an input to the incremental meta-decision tree algorithm. This incremental meta-decision tree algorithm applies the Hoeffding inequality in order to induce a bound on the estimated split criteria to evaluate the variance reduction of a given attribute and a threshold compared to other attributes. In this way, the OnlineMetaBags system 100 can update the meta-trees $MT_j$ 114 such that they select the appropriate base learner for accurate prediction. In training mode, the OnlineMetaBags system 100 uses the target value y to provide feedback to adjust the model to improve accuracy.

Once the meta-trees 114 are updated, the OnlineMetaBags system 100 performs aggregation (S105). In this phase, the decision 112 made by each the ensemble of meta-trees is averaged using a weighting scheme, which takes into consideration the performance of each meta-tree in the past. The result of this aggregation is the prediction ŷ 124. In training mode, the OnlineMetaBags system 100 can compare the prediction ŷ 124 with the target value y to provide feedback to adjust the model to improve accuracy. For example, the OnlineMetaBags system can update the weighting scheme based on the feedback.

Once the process completes for the current instance 112, this instance 112 is discarded (S101C) and a new instance 112 (i.e., an instance from t+1 that contains ($x_{t+1}$, $y_{t+1}$)) can be used by the OnlineMetaBags system 100 in the manner just described (S101-S105).

When the OnlineMetaBags system 100 is not in the learning mode (i.e., is observing instances 1112 with the feature vector x without the target value y), the operations of updating the base learners 116 and meta feature generators 118 (S103) and updating the meta trees 114 (S104) do not occur. Instead, the $k^j$ copies of the instance 112' are sent to the meta-trees 114, which each select a base learner 116 that is then used to make a prediction decision 122. The prediction decisions 122 for all of the meta-trees 144 are then aggregated to determine the prediction 124.

Figure 2:
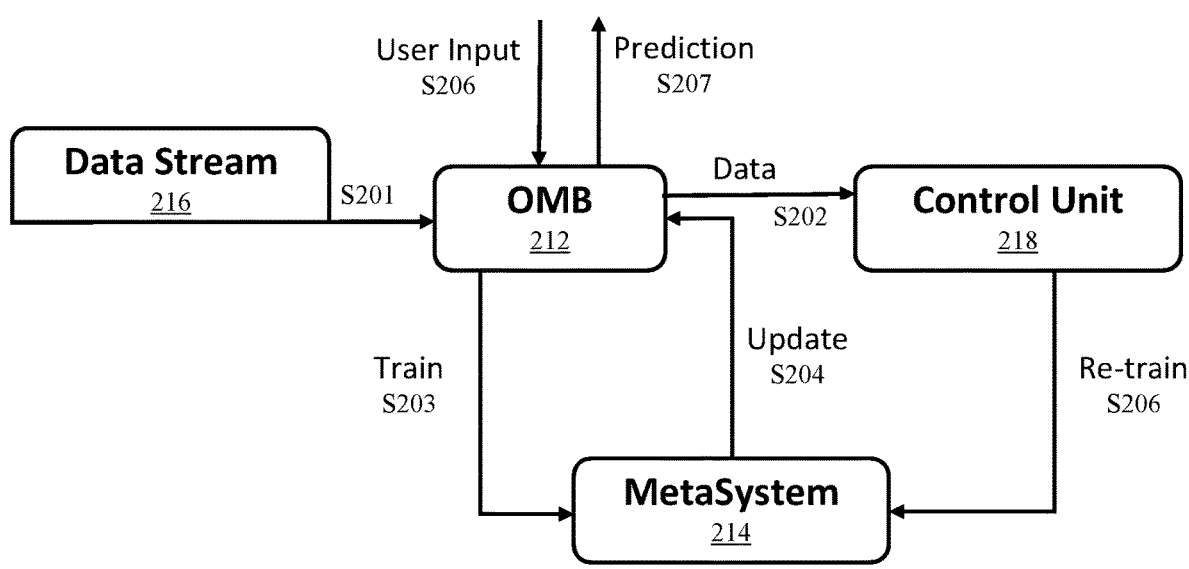
FIG. 2 illustrates an overview of components and data flows of a machine learning system using OnlineMetaBags according to an embodiment of the present invention.

FIG. 2 illustrates a general overview of components and data flows of a machine learning system 200 using OnlineMetaBags (OMB) according to an embodiment of the present invention.

In FIG. 2, the OMB unit 212 includes the ensemble, which includes the above-described functionalities provided by the present invention.

The MetaSystem 214 contains the elements of the ensemble and the meta-level elements (e.g., base learners and meta-feature generators).

By way of illustration, when a new instance from the data stream 216 is received by the OMB unit 212, the OMB unit 212 consults (S203) the MetaSystem 214 for the best (set) of base learners that will be used for the prediction. In this scenario, the ControlUnit 218 is responsible for keeping the status of the MetaSystem 214 up-to-date (S205).

Also, as shown in FIG. 2, the OMB unit 212 receives (s201) a data stream 216, and distributes the data by passing it on to the Control Unit (window mechanism) 218 (S202) and the MetaSystem 214 (S203). The MetaSystem trains the OMB model using the new incoming data 216, and generates an output that is then used to update OMB 212 (S204).

The Control Unit 218 governs a regular retraining of the OMB model in order to keep the machine learning system 200 consistent with recent data. (S205)

Additionally, the OMB unit 212 can receive a user input (S206) at any given time to produce a real-time prediction using the current OMB model (S207).

In greater detail, when the machine learning system 200 is in a training mode, the OMB 212 receives a new instance from the data stream 216 (S201), and then performs online-bagging on the new instance and passes the bags to the MetaSystem 214 (S203). The MetaSystem 214 then updates the base learners and meta-feature generators with the received bags, extends the instances with the meta-features, and then sends its status and the extended instances back to the OMB 212 (S204). The OMB 212 then induces and updates the meta-trees based on the MetaSystem's status and the meta-features, uses the updated meta-trees to make decisions from the instance, aggregates the decisions to make a prediction, and then sends the prediction to the control unit 218 (S202). The control unit 218 can then compare the prediction to the target data and retain the MetaSystem 214 (e.g., instruct it to perform an update) (S206).

When the machine learning system 200 is in a prediction mode, the OMB 212 receives an instance as a user input (206). The OMB 212 then performs online meta-bagging with aggregation to make a prediction, which is sent to the user (S207). As described above, online meta-bagging with aggregation includes, bagging the user input, sending the bags to the meta-trees to make a plurality of predictions, which are aggregated to arrive at the final prediction. The control unit 218 is also sent the prediction (S202), which it can evaluate and use to send training information to the MetaSystem 214 (e.g., provide information on which base learner or meta-tree made the predictions).

Some applications of embodiments of the present invention include: Transportation (demand and travel time prediction); Retail demand prediction; Prediction of stock market price; Traffic; and Air Quality.

Transportation (demand and travel time prediction): Consider a set of routes connecting the different parts of a city. Each route $R_i$ consists of $n_i$ stops. Let the set $P_{ij}$ be the set of realizations of the route $R_j$, i.e., the set of actually travelled routes. Depending on the data collected from Automatic Passenger Counting (APC) and Automatic Vehicle Location (AVL) systems, the number of boarding and alighting travelers can be collected at each bus stop, as well as the time of the vehicle arrival and departure. Using the approach of the present invention, the following problems can be formulated and solved:

a. Demand prediction at a given location/stop:
For this problem the regression problem can be formulated at the level of location/stop and an instance would be each realization of each trip that passes through that stop. The target of each instance is the prediction of the number of passengers that are willing to board at this stop.

b. Travel time prediction:
Similar to the previous problem, the target prediction of an instance, here, is the time a trip requires reaching a given stop, given the features of the trip, route, and time.

For the aforementioned prediction problems, defined in scope of intelligent transportation, the approach of the present invention offers better predictive performances by learning a meta-learner to choose the best algorithm for the given sample. In addition, the meta-learner and base models can be updated incrementally with little computation and storage cost that is perfect for these real time applications.

Retail demand prediction: In the retail market, shops' owners need an automatic supply chain system that decides the right products to be offered at the right time based on intelligent decision making algorithms. Such a system can be realized with embodiments of the present invention. Embodiments offer to predict the sales of all products by formulating this as a stream regression problem based on sales history, e.g. the sales of previous days. With this formulation, the retail demand prediction can be incrementally solved with the approach of the present invention efficiently because the demand for products changes daily. An advantage of applying the approach of the present invention to retail problems, compared to other approaches, is that embodiments of the present invention incrementally train the meta-learner that chooses the best methods for the given sample, which provides better accuracy. The model updating can be accomplished in real time with little computation and storage cost.

Prediction of stock market price: The demand and offer of stocks in the market could be modelled by a streaming regression problem, where the purchases of each share are represented as a regression instance. The aim is to predict the stock value for the next points. Here, one advantage of applying the approach of the present invention is that meta-learning is used incrementally so that better prediction accuracy can be achieved with real time model update.

Traffic: Traffic control is an application of the present invention where the algorithm can predict the number of cars driving on a given highway. Based on these predictions, the system decides which roads, feeding the highway, to close and how to re-route the traffic. Embodiments of the present invention are capable to solve this problem, especially because of the fact that the traffic situation is dynamically changing due to many factors such as social and cultural events.

Air Quality: Based on predictions of NOx, PM, and $CO_2$ emission, embodiments of the present invention can also be used in a system that decides which roads will be closed and which cars are not permitted to enter that given region due to their emission category. Embodiments are well suited for the air quality prediction problem, since air pollution is a non-stationary phenomenon that varies over seasons and weather conditions.

Embodiments of the present invention have the advantage of achieving good performance in non-stationary environments under the constraints of limited time and computational resources. For example, as shown in FIGS. 3a and 3b, performance results of an embodiment of the present is shown out-performing state-of-the-art methods.

To create the performance results in FIGS. 3a and 3b, experiments were conducted to assess the performance of OnlineMetaBags (OMB) using various data sets/streams from different sources, including the University of California-Irvine Machine Learning Repository (url:archive.ics.uce.edu/ml) and other repositories (e.g., ARFF datasets of the Connectionist Artificial Intelligence Laboratory. url: github-.com/renatopp/arff-datasets/tree/master/regression).

Also used were proprietary datasets originating from public transportation in Rome and Stockholm (these data sets include scheduling times of the buses, route information and the number of passengers boarding and alighting to buses at different bus stops). In the experiments using these transportation datasets, the data was used for the purpose of demand prediction represented by the boardings or alightings, when taking into consideration the current time, bus stop, and the status in the last lag stops (with lag $\epsilon\{1,3\}$). An additional stream was also created that simulates a change in the demand prediction task that mimics a transfer learning scenario, to this end the streams were appended to impose the change.

A summary of the data sets/streams used in the experiments can be found in FIG. 4.

The question considered in the evaluations is: How does OMB perform compared to: (1) state-of-the-art meta-learners on data streams (BLAST); (2) state-of-the-art adaptive regression learners (AMRules and FIMTDD); and (3) base learners used in the ensembles.

The following base learners were used as part of the ensemble of OMB (OMBS): K-NearestNeighbor (KNN), HoeffdingTree (HT), GradientBoosting (GRB), Random-Forest (RF), GaussianProcesses (GP), SVR, BayesianRegression (BR). Except for HT, all base learners were batch learners and used as proposed in Brzezinski and Stefanowski, "Combining block-based and online methods in learning ensembles from concept drifting data streams," Information Sciences 265, pp. 50-67 (2014) (the entire contents of which is hereby incorporated by reference herein), for combining block-based and online methods. Base learners were used with their default settings. For example, block-based methods had the window size set to 500 with training after intervals of 100 instances. For comparison with BLAST—and since BLAST was only proposed for classification problems—the selection criteria was reformulated by replacing the 0/1 loss with the mean squared error (MSE), and allowing the ensemble to contain the same set of heterogeneous base learners that are part of the OMB approach of the present invention.

In the analysis, a prequential evaluation method was applied, which is common practice in data stream mining, and the hyperparameters of OnlineMetaBag were set as indicated in Table 1. FIGS. 3a and 3b show the MSE, including the standard error, for each data set and method over 5 random runs with different shuffling. As can be seen in FIGS. 3a and 3b, the OnlineMetaBags (OMB) approach of the present invention outperforms all the competitors on 16 of the 24 data sets, which proves its applicability and superiority as an online learning method.

TABLE 1

Hyperparameter used in OnlineMetaBags

| | Value | Description |
| --- | --- | --- |
| L | 5 | ensemble size (no. meta-trees) |
| δ | 0.05 | confidence level |
| τ | 0.005 | tie-breaking constant |
| γ | 0.01 | complexity factor |
| α | 0.999 | weighting factor |
| FP | 0.3 | random feature percentage |
| BST | 15 | BST maximal size |
| NLS | 1.5 | node level significance |

Figure 5:
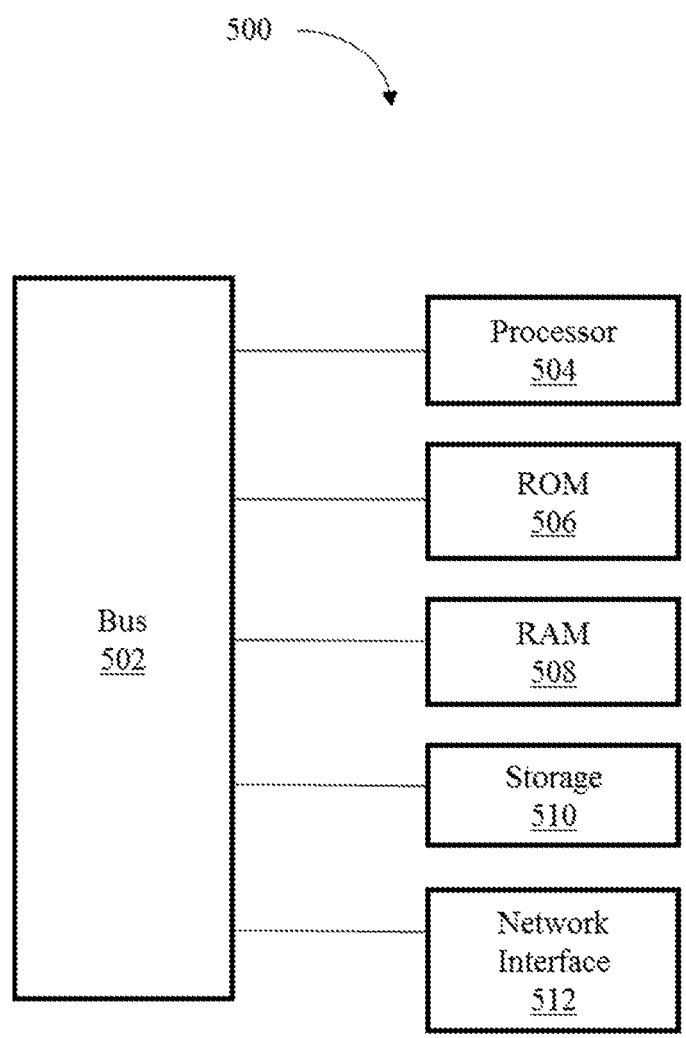
FIG. 5 is a block diagram of a machine learning processing system according to an embodiment.

FIG. 5 is a block diagram of a machine learning processing system according to an embodiment. The processing system 500 is a specialized computer system that has been specifically programmed and configured to implement an embodiment of the systems, methods and/or modules described above. The processing system 500 includes a processor 504, such as a central processing unit (CPU) of a computing device or a distributed processor system. The processor 504 executes processor executable instructions to invoke embodiments of the system for performing the functions and methods described above. In embodiments, the processor executable instructions are locally stored or remotely stored and accessed from a non-transitory computer readable medium, such as storage 510, which may be a hard drive, cloud storage, flash drive, etc. Read Only Memory (ROM) 506 includes processor executable instructions for initializing the processor 504, while the random-access memory (RAM) 508 is the main memory for loading and processing instructions executed by the processor 504. The network interface 512 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill. In particular, the present invention covers further embodiments with any combination of features from different embodiments described above. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for online learning from a data stream with an ensemble of meta-trees, the method comprising:
observing a data instance from the data stream;
for each of the meta-trees, replicating the data instance to generate a number of replicated data instances;
for each of the meta-trees, updating meta-tree components using the number or replicated data instances; and
inducing each of the meta-trees based on the data instance and the updated meta-tree components, wherein inducing each of the meta-trees comprises employing a concentration bound to determine whether a split criterion is satisfied.

2. The method according to claim 1, wherein the number of replicated data instances is selected according to the Poisson distribution with λ=1.

3. The method according to claim 1,
wherein the meta-tree components comprise base learners and meta-feature generators, and
wherein the base learners and meta-feature generators are induced and updated based on the corresponding number of replicated data instances.

4. The method according to claim 3,
wherein the base learners are incremental learners, and
wherein the data instance is discarded prior to updating the base learners based on a new data instance from the data stream.

5. The method according to claim 3,
wherein the base learners comprise at least one non-incremental learner,
wherein the non-incremental learner is batch updated based on a sliding window of data instances, including the data instance, and
wherein the data instance is discarded when it is outside the siding window.

6. The method of claim 1,
wherein the online meta-learner is configured to perform regression predictive modeling, and
wherein in the split criterion is determined by a variance reduction calculation.

7. The method of claim 6,
wherein the variance reduction calculation is based on a decrease in a variance caused by splitting a set of instances covered by a leaf node into two sets of instances,
wherein the variance reduction calculation determines a highest achieved variance reduction and a second highest achieved variance reduction up to receiving the data instance, and
wherein a reduction ratio R is determined as the ratio of the second highest achieved variance over the highest achieved variance.

8. The method of claim 7, wherein a split is accepted and performed upon observing that $R+\epsilon<1$, where $$\epsilon = \sqrt{\frac{\ln\left(\frac{1}{\delta}\right)}{2t}}$$

and $\delta$ is a confidence level and the concentration bound is the Hoeffding inequality.

9. The method of claim 6, wherein a penalty criterion is applied to make it gradually more difficult for a split to be accepted in fully grown meta-trees.

10. The method of claim 1, wherein a predictive weight of each of the meta-trees is updated relative to an error between the target value and a predicted value.

11. The method of claim 10, wherein the predictive weight of each of the meta-trees is also updated relative to the number of replicated instances for the corresponding one of the meta-trees.

12. The method of claim 1,
wherein the online meta-learner is configured to perform classification predictive modeling, and
wherein the split criterion is determined by maximizing information gain.

13. The method of claim 1, the method further comprising:
observing a non-training instance based on observing a feature vector without an accompanying target value;
for each of the meta-trees, determining a base learner for performing a prediction;
performing the prediction by the determined base learner of each of the meta-trees to determine a plurality of predicted values based on the non-training instance;
aggregating the predicted values to determine the predicted value using an error weighted scheme; and
outputting the predicted value.

14. An online meta-learner comprising a processor coupled to a non-transitory storage memory containing instructions, which when executed by the processor, cause the online meta-learner to:
observe a data instance from a data stream;
for each of the meta-trees, replicate the data instance to generate a number of replicated data instances;
for each of the meta-trees, update meta-tree components using the number or replicated data instances; and
induce each of the meta-trees based on the data instance and the updated meta-tree components, wherein inducing each of the meta-trees comprises employing a concentration bound to determine whether a split criterion is satisfied.

15. A non-transitory processor-readable storage medium storing instructions that upon execution cause an online meta-learner to:
observe a data instance from a data stream;
for each of the meta-trees, replicate the data instance to generate a number of replicated data instances;
for each of the meta-trees, update meta-tree components using the number or replicated data instances; and
induce each of the meta-trees based on the data instance and the updated meta-tree components, wherein inducing each of the meta-trees comprises employing a concentration bound to determine whether a split criterion is satisfied.

* * * * *